Dec. 17, 1968     E. H. LAND ET AL     3,416,866

COMPARISON PHOTOMETER USING LENTICULAR SCREEN

Filed April 13, 1964

INVENTORS
Edwin H. Land
and
William H. Ryan
BY Brown and Mikulka
Donald H. Sandler
ATTORNEYS United States Patent Office 3,416,866
Patented Dec. 17, 1968

3,416,866
COMPARISON PHOTOMETER USING LENTICULAR SCREEN
Edwin H. Land, Cambridge, and William H. Ryan, Carlisle, Mass., assignors to Polaroid Corporation, Cambridge, Mass., a corporation of Delaware
Filed Apr. 13, 1964, Ser. No. 359,109
4 Claims. (Cl. 356—230)

ABSTRACT OF THE DISCLOSURE

A comparison photometer is described in which a lenticular screen is employed to permit light from two independent sources to be brought together in a common field of view for comparison purposes.

---

Figure 1:
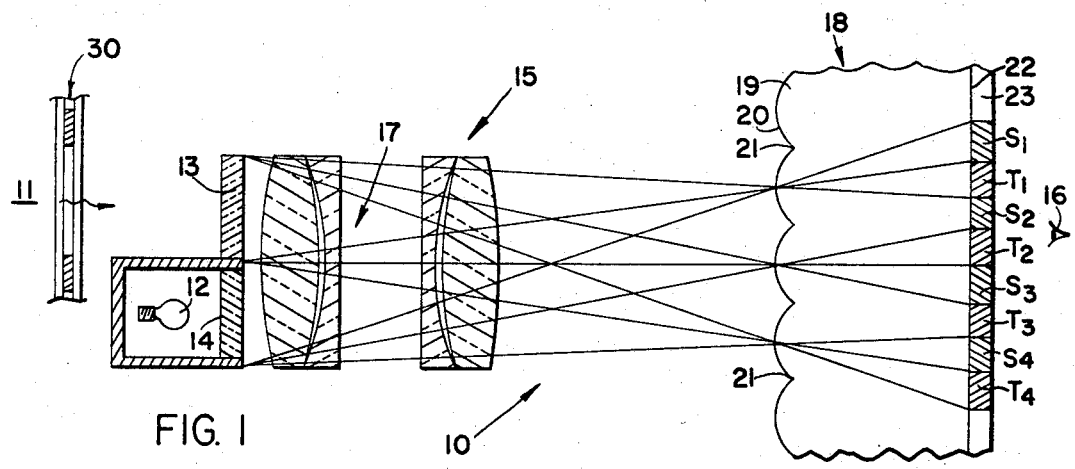

Conventional comparison photometers involve bringing a light source of unknown brightness into a common field of view with a light source of known and controllable brightness. When the sources are photometrically unbalanced, light and dark areas are defined, the boundary between which is sharp and easily discernible. At balance, the field appears uniformly bright and the boundary between the areas disappears. Thus, the precise point of interest is marked by the disappearance of a pattern defined by contrasting levels of brightness. While such disappearance indicates photometric balance, it is a negative indication apparent to an observer only because he knows that imbalance in one direction produces a pattern of light and dark areas that reverses on passing through balance. For obvious reasons, it would be highly desirable to provide a positive indication to an observer that balance has been achieved. Apparatus capable of presenting to an observer an intelligible pattern in contrasting levels of brightness when the brightness of the two sources has a predetermined relationship (e.g., equality), and an unintelligible pattern when the brightness of the sources has any other relationship, is disclosed and claimed in copending application Ser. No. 359,116, filed Apr. 13, 1964, now Patent 3,323,431 and is the sole invention of Edwin H. Land, one of the joint inventors in this application, the primary object of which is to disclose improved apparatus of the type described utilizing a lenticular screen.

Briefly, the basic invention requires light from each of two independent uniformly illuminated source areas to be viewed in a common field through separate fixed visible patterns that are in registration or alignment with each other. The configuration of the composite pattern thus formed is dependent, not only on the configuration of the fixed patterns, but on the polarity and magnitude of the photometric imbalance existing between the brightness of the two source areas. Where the magnitude of the imbalance is zero, the brightness of the source areas are equal. By using properly designed fixed patterns, the composite pattern will define a preselected configuration (or index) at a given value of photometric imbalance. Moreover, a visual indication that such value of imbalance has been reached is provided when the index is there uniquely intelligible, but concealed or camouflaged and made unintelligible when a change in the imbalance produces a changed configuration. Selection of fixed patterns which cause an index to be intelligible only at photometric balance provides a positive indication to an observer that photometric balance has been reached, and will thus achieve the primary object of the present invention. The present invention utilizes the optical geometry of a lenticular screen to permit light from two independent sources to be combined in a common field such that the primary object of the present invention is achieved.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention by those skilled in the art.

Figure 2:
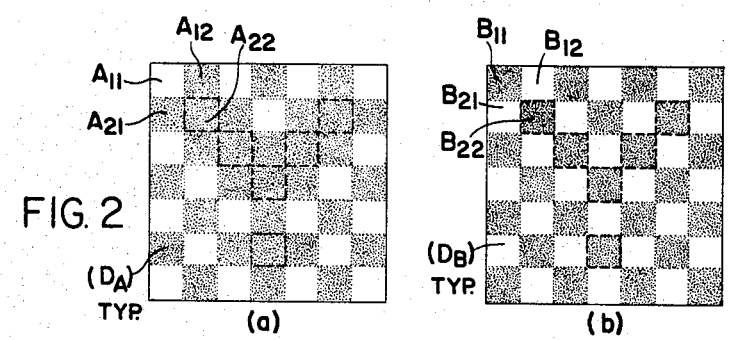
Figure 4:
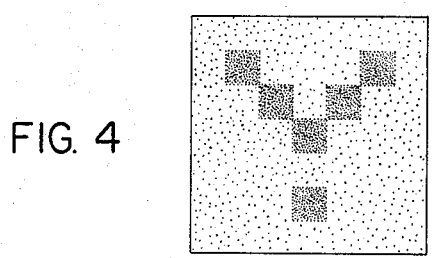
Figure 3:
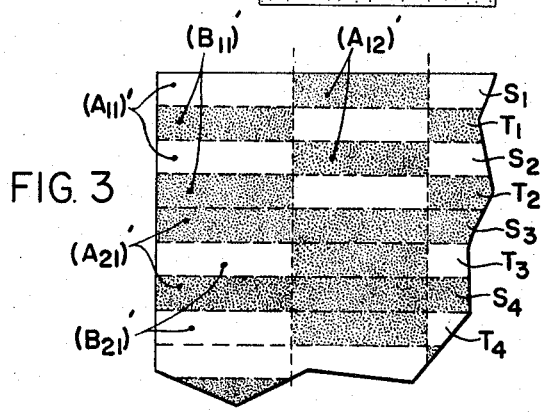

For a fuller understanding of the nature and objects of the invention, reference should be had to the following detailed description taken in connection with the accompanying drawings wherein:

FIGURE 1 is a schematic illustration of a comparison photometer utilizing a lenticular screen;

FIGS. 2(a) and (b) are representative of a pair of fixed patterns rendered in terms of contrasting densities;

FIG. 3 is an enlarged view of a portion of a lenticular screen, viewed from the smooth side, showing the manner in which the fixed patterns shown in FIG. 2 are interlaced to define a composite pattern; and FIG. 4 is representative of the composite pattern seen when the independent two light sources applied to the lenticular screen are photometrically balanced.

Referring now to FIGURE 1, reference numeral 10 designates a comparison photometer in which the ability of a lenticular screen to bring light from two independent sources into a common field is illustrated. Photometer 10 is used in connection with two independent sources of light denoted at 11 and 12 and termed screen source and reference source respectively. Diffuser 13 associated with source 11 and diffuser 14 associated with source 12 define a pair of independent light source areas which are uniformly illuminated so that no brightness gradient exists across either diffuser. As indicated in the drawing, the pair of diffusers are in side-by-side arrangement.

Optical means 15 for bringing light from both diffusers into a common field of view of observer 16 comprises lens system 17, interposed between lenticular sheet 18 and the pair of diffusers 13, 14. Lenticular sheet 18 comprises transparent base or emulsion support 19, having an embossed surface 20 defining a plurality of cylindrical lenses 21 and a smooth surface 22; and emulsion 23 on surface 22 bearing a composite pattern defined in terms of optical density. Sheet 18 is arranged so that surface 20 is closer to the pair of diffusers than surface 22. With the above-described arrangement, an observer at 16 will see two interlaced independent images, described more fully below, formed on emulsion 23 and each illuminated by a separate one of diffusers 13 and 14. When the lenses 21 are small enough, the images will appear to be continuous. For convenience, a pattern rendered in terms of optical density and arranged on a transparent support for viewing by transmitted light is referred to hereinafter as a "transmission density pattern." In the preferred embodiment shown emulsion 23 defines two interlaced transmission density patterns in proper relative position, i.e. registered, such that light from only one diffuser illuminates one pattern and light from only the other diffuser illuminates the other pattern; a photometric device is thus achieved.

Referring again to FIGURE 1, strips $S_1$, $S_2$ ... on emulsion 23 are illuminated by light only from diffuser 13 and strips $T_1$, $T_2$ ... on emulsion 23 are illuminated by light only from diffuser 14, the strips S and T being interlaced. Assume now that the strips S define the density pattern shown at FIG. 2(a) and that the strips T define the density pattern shown at FIG. 2(b). An enlarged section of the emulsion as seen by an observer at 16 would appear as shown in FIG. 3 wherein the four upper left elemental squares of the two patterns ($A_{11}$, $A_{12}$, $A_{21}$ and $A_{22}$; and $B_{11}$, $B_{12}$, $B_{21}$ and $B_{22}$) of FIGS. 2(a) and (b) are shown. (The subscripts associated with the elemental squares refer to the row and column respectively of the pattern.) Each square has been divided into four strips, two of which are contributed by each of the two patterns of FIGURES 2(a) and (b) respectively. The selection of both the pattern configuration and the number of strips has been chosen to facilitate illustration of the principles involved, it being understood that other patterns could be used and that the spacing of the strips can be selected such that the interlaced nature of the composite image is not apparent to a viewer. In such case, observer 16 viewing emulsion 23 would see the patterns of FIGS. 2(a) and (b) in registration, i.e. accurately positioned with respect to each other, each pattern being rendered in terms of contrasting levels of brightness and separately illuminated by a different one of the diffusers.

Each of the two transmission density patterns, shown in their entirety in FIGS. 2(a) and (b), contains an index symbol, shown in this example as the letter Y by the broken lines. Only when the two diffusers are in photometric balance will the index symbol be intelligible to observer 16, however as indicated in FIG. 4 wherein the index symbol is rendered against a background in terms of contrasting levels of brightness. When the diffuser associated with the pattern shown at FIG. 2(a) is brighter than the other diffuser, an observer would see the pattern reassembling that of FIG. 2(a). When the photometric imbalance is reversed, a pattern resembling that of FIG. 2(b) would be seen. In each case, the index is visible but is not intelligible because of the confusing background. Such background becomes uniformly bright only at photometric balance.

To understand why this is so, consider FIG. 3 again wherein the area designated by strips $(A_{11})'$ represents half the area of square $A_{11}$ shown in FIG. 2(a), and the area designated by strips $(B_{11})'$ represents half the area of square $B_{11}$ shown in FIG. 2(b), etc. If the photographic densities of each of areas $(A_{11})'$ and $(B_{11})'$ are designated $D_{A1}$ and $D_{B1}$ respectively, and the densities of each of areas $(A_{21})'$ and $(B_{21})'$ is designated $D_{A2}$ and $D_{B2}$ respectively, it can be shown that the brightness of the two composite areas formed by $(A_{11})'$ and $(B_{11})'$, and $(A_{21})'$ and $(B_{21})'$ will be equal when the respective densities are related as follows:

$$D_A = D_B - lg[K10^{D_B} - 1] \quad (1)$$

where $D_A$ and $D_B$ are densities of elemental areas in each of the two patterns that are brought into registration by the lenticular screen; and K is the ratio of incident intensity to the transmitted intensity over any of a pair of corresponding areas in each pattern. The constraints on equation 1 are: $(D_A)_{max} = -lg(K-1)$; $1 < K \leq 2$; and $(D_B)_{min} = 0$. For $K = 1.25$, and $D_B = 0$, $D_A$ is required to be 0.6. Typical elemental areas are shown in FIGS. 2(a) and (b).

If the brightness of the two diffusers are related by the quantity $k$, and if $K = 1.25$, it follows from the definition of photographic density that the relative intensity of transmitted light due to the composite area $(AB_{11})'$ made up of strips $(A_{11})' + (B_{11})'$ will be:

$$\frac{(I_1)_o}{(I)_i} = \frac{k}{4} + 1 \quad (2)$$

while the relative intensity of transmited light due to composite area $(AB_{21})'$ made up of strips $(A_{21})' + (B_{21})'$ will be:

$$\frac{(I_2)_o}{(I)_i} = k + \frac{1}{4} \quad (3)$$

where the quantity $(I)_i$ represents the intensity of light on one diffuser (e.g., diffuser 14) which remains constant and the quantities $(I_1)_o$ and $(I_2)_o$ represent the intensities of light transmitted by the two composite areas $(AB_{11})'$ and $(AB_{21})'$. It is evident that when adjustable diaphragm 30 (FIGURE 1) is positioned such that the intensity of light on diffuser 13 is the same as the intensity of light on diffuser 14 (i.e., $k = 1$), $$\frac{(I_1)_o}{(I)_i} = \frac{(I_2)_o}{(I)_i} = 1.25$$

This means that composite areas $(AB_{11})'$ and $(AB_{21})'$ of the screen are equally illuminated and thus define a portion of the background shown in FIG. 4 against which the index symbol is uniquely intelligible. When $k > 1$, (e.g., diffuser 13 brighter than diffuser 14):

$$\frac{(I_2)_o}{(I)_i} > \frac{(I_1)_o}{(I)_i}$$

This means that composite area $(AB_{21})'$ is brighter than composite area $(AB_{11})'$ and observer 16 sees a pattern similar to that at FIG. 2(b), and the index symbol is not intelligible. On the other hand, when $k < 1$ (e.g., diffuser 13 less bright than diffuser 14):

$$\frac{(I_2)_o}{(I)_i} < \frac{(I_1)_o}{(I)_i}$$

This means that area $(AB_{21})'$ is less bright than area $(AB_{11})'$ and observer 16 sees a pattern similar to that at FIG. 2(a), and the index is again unintelligible. Because of the precision with which the brightness of adjacent surfaces can be compared, a small perturbation in the photometric balance which discernibly alters the background of the composite pattern as seen by observer 16 will provide a clear indication that imbalance is present. Hence, while the index may be intelligible at a small imbalance, it is not uniquely intelligible when one considers the term "index" to include, not only the symbol, but the background on which the symbol appears. Therefore, photometric balance is considered to occur only when the symbol appears against a uniform background. The symbol is then termed "uniquely intelligible."

In view of the above, it will be apparent to those skilled in the art that any index symbol can be defined at photometric balance by properly selecting the fixed transmission density pattern associated with the lenticular screen. Furthermore, intelligibility can be caused to occur at any polarity and magnitude of photometric imbalance merely by proper selection of the fixed transmission density pattern.

The lenticular screen associated with the above-described invention serves the dual purpose of combining light from two independent light sources as well as providing two independent fixed patterns by which an index symbol can be rendered uniquely visible at a predetermined polarity and magnitude of photometric imbalance between the two sources (i.e., a magnitude of zero). One method of constructing a suitable lenticular screen involves obtaining a piece of lenticular film having a photosensitive emulsion on one surface which is exposed to a pair of fixed patterns (like those shown in FIG. 2) such that the images of each pattern are interlaced on the emulsion. The latent image so formed may then be developed to produce a lenticular screen such as is illustrated schematically in FIG. 3. The advantage of this approach is that the fixed density patterns are interlaced on the lenticular film, and the lens system associated with the screen and the two diffusers permit light from only one of the diffusers to illuminate one pattern and light from only the other diffuser to illuminate the other pattern. The index symbol is a part of both patterns and is in registration with the composite pattern on the screen. However, it is also possible to provide the index symbol on only one pattern, provided the other pattern is so arranged that when the patterns are viewed in registration the index symbol is unintelligible except at photometric balance.

While the drawing indicates that the relative brightness of the two diffusers is controlled by adjustment to diaphragm 30 when the brightness of source 12 is held constant, it is believed apparent that the present invention involves only the provision of means to vary the relative brightness of the two diffusers. Hence, diaphragm 30 could be eliminated and relative brightness variations developed by controlling the parameters of the electrical circuit associated with source 12.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A comparison photometer comprising in combination:

a pair of light sources each of which is independently and uniformly illuminated;

optical means for bringing light from both sources into a common field of view, said optical means comprising a lenticular screen through which light from both of said pair of sources is viewed, and means mounting said screen so that images of said sources are differentially separated and interlaced in said field of view, said screen having thereon first and second interlaced patterns rendered in terms of transmission densities and oriented such that light from only one of said sources illuminates said first pattern and light from only the other of said sources illuminates said second pattern; and said first and second patterns being arranged to define an index symbol on a background such that at photometric balance between said sources, said index symbol is uniquely intelligible against said background in contrasting levels of brightness but is unintelligible when said sources are out of photometric balance.

2. In a photometric device by which the brightness of two sources can be compared, the combination of:

(a) a pair of diffusers individually associated with each source and mounted in side-by-side arrangement; and (b) a transparent base having an embossed surface defining a plurality of cylindrical lens elements and a smooth surface opposite said embossed surface, said base being arranged relative to said pair of diffusers so that said embossed surface is closer to said diffusers than said smooth surface and images of said pair of diffusers are differentially separated and interlaced on said smooth surface;

(c) said smooth surface being provided with first and second interlaced patterns rendered in terms of transmission densities and oriented so that light from only one diffuser illuminates said first pattern and light from only the other diffuser illuminates said second pattern, said first and second patterns being arranged to define an index symbol that is uniquely intelligible against a background in contrasting levels of brightness when said diffusers are in photometric balance.

3. Apparatus in accordance with claim 2 wherein said first and second patterns are arranged to define an index symbol that is unintelligible against a background of contrasting levels of brightness when said diffusers are not in photometric balance.

4. A photometric device by which the brightness of two light sources can be compared comprising:

(a) means defining a field of view containing an index symbol and a background pattern of discrete areas for said symbol, said symbol and the discrete areas of said background pattern being constructed and arranged to render said symbol as the dominant perceptible element in said field of view when the background pattern exhibits a relatively low brightness contrast and to render said pattern as the dominant perceptible element in said field of view when the background pattern exhibits a relatively high brightness contrast;

(b) optical means comprising a lenticular screen for differentially illuminating the discrete areas of said background pattern with uniform light from said two sources; and (c) means for adjustably varying the relative proportions of light directed by said lenticular screen at said pattern to alter the brightness contrast between the discrete areas of said background pattern, whereby said index symbol is concealed or camouflaged by the dominance of said background pattern when the latter exhibits a relatively high contrast, but becomes uniquely perceptible against said background pattern when the contrast of said background pattern areas is low at or near photometric balance.

References Cited

UNITED STATES PATENTS

| | | |
|---|---|---|
| 2,246,817 | 6/1941 | Sauer. |
| 2,333,759 | 11/1943 | Akelaitis. |
| 3,323,430 | 6/1967 | Cooper. |
| 3,323,431 | 6/1967 | Land. |
| 1,708,371 | 4/1929 | Seymour _____ 350—167 X |

FOREIGN PATENTS 1,178,353   12/1958   France.

JEWELL H. PEDERSEN, *Primary Examiner.*

W. A. SKLAR, *Assistant Examiner.*

U.S. Cl. X.R.

350—167; 356—243